(12) United States Patent
Oberholzer et al.

(10) Patent No.: US 12,333,098 B2
(45) Date of Patent: Jun. 17, 2025

(54) CONTROLLER MECHANISM

(71) Applicant: AVA INNOVATIONS AG, Solothurn (CH)

(72) Inventors: Raphael Oberholzer, Solothurn (CH); Dimitri Leimgruebler, Aarau (CH); Patrick Domenig, Nidau (CH); David Berger, Oberwangen (CH)

(73) Assignee: AVA INNOVATIONS AG, Solothurn (CH)

( * ) Notice: Subject to any disclaimer, the term of this patent is extended or adjusted under 35 U.S.C. 154(b) by 0 days.

(21) Appl. No.: 18/824,396

(22) Filed: Sep. 4, 2024

(65) Prior Publication Data

US 2025/0077005 A1 Mar. 6, 2025

Related U.S. Application Data

(60) Provisional application No. 63/580,436, filed on Sep. 5, 2023.

(51) Int. Cl.
| | | |
|---|---|---|
| *G06F 3/041* | (2006.01) | |
| *G06F 3/0354* | (2013.01) | |
| *G06F 3/038* | (2013.01) | |

(52) U.S. Cl.
CPC ........ *G06F 3/0383* (2013.01); *G06F 3/03547* (2013.01); *G06F 2203/0383* (2013.01)

(58) Field of Classification Search
CPC .... G06F 1/1626; G06F 3/03547; G06F 3/038; G06F 2203/0383
See application file for complete search history.

(56) References Cited

U.S. PATENT DOCUMENTS

| | | | | |
|---|---|---|---|---|
| 8,217,908 | B2* | 7/2012 | Gray | G06F 3/0238 |
| | | | | 715/702 |
| 10,162,425 | B2* | 12/2018 | Nakamura | H01H 13/78 |
| 2015/0199023 | A1* | 7/2015 | Hu | G06F 3/04883 |
| | | | | 345/173 |
| 2016/0233913 | A1 | 8/2016 | Wang et al. | |
| 2019/0107889 | A1* | 4/2019 | Togashi | B60K 35/60 |
| 2020/0218378 | A1* | 7/2020 | Takai | G06F 3/03547 |
| 2020/0393907 | A1* | 12/2020 | Gray | G06F 3/04886 |

OTHER PUBLICATIONS

Written Opinion of the International Search Authority for PCT1B2024/058573 mailed Jan. 3, 2025.

* cited by examiner

*Primary Examiner* — Joe H Cheng
(74) *Attorney, Agent, or Firm* — Biotech Beach Law PC; Raymond Wagenknecht

(57) ABSTRACT

A controller mechanism having a selectable actuator with a touchscreen that displays a plurality of selectable options and is configured to highlight a selection from the plurality of selectable options by touch, and extending outward from the actuator is a plurality of protrusions; a frame having an aperture through which the selectable actuator extends and the plurality of protrusions do not extend; a carriage having a spring that presses against the selectable actuator at a plurality of different locations to float the plurality of protrusions against the frame and a shared selection button that can be pressed by the actuator when the spring is compressed; wherein entering the selection from the plurality of selectable options includes highlighting the selection by touch and pressing the selection button; and wherein the plurality of protrusions prevent substantial lateral movement of the actuator.

11 Claims, 5 Drawing Sheets

CONTROLLER MECHANISM

CROSS-REFERENCE TO RELATED APPLICATIONS

This application claims the benefit of priority to U.S. patent application No. 63/580,436, filed Sep. 5, 2023, which is herein incorporated by reference in its entirety.

TECHNICAL FIELD OF THE INVENTION

The invention relates to a controller mechanism for use with electronic devices and more specifically to a controller mechanism combining a touchscreen with a pushbutton mechanism.

BACKGROUND OF THE INVENTION

Broadly, controller mechanisms are found on nearly all electronic devices for controlling operations. Controller mechanisms are used to power electronic devices on and off, raise and lower volume, change channels or frequencies, connect to various networks, and other functions. Further, controller mechanisms have been developed into remote controls, which allow electronic devices such as televisions, stereos, cable boxes, and the like to be controlled remotely. Still further, universal remote controls have been developed to control multiple electronic devices, thereby reducing the number of individual remote controls for different devices.

Whether integrated into the electronic device itself or a remote control, two types of controller mechanisms are found most often, mechanical controller mechanisms and newer touchscreen controller mechanisms. Among the most prevalent mechanical controller mechanisms are those that operate by physically pressing a spring-loaded button. Often, as the button is depressed, the underside of the button presses an activating mechanism or completes a circuit, thereby instructing activation or selection. In either configuration, a benefit of mechanical mechanisms is the tactile feedback, the user can often feel actuation, such as a mechanical "click", through the fingers. As such, the operator does not have to look at the device to confirm a selection. However, a disadvantage of many mechanical mechanisms is that their appearance often remains static, which may not be visually appealing to the user. Another disadvantage is that there is often excessive play in mechanical mechanisms, which can confuse the user and/or provide an undesirable tactile experience. As an example, mechanical activation buttons can often rock side to side or slide laterally without actual activation.

Some of the above disadvantages have been overcome through the adoption of touchscreen controller mechanisms. Touchscreen controls most often work using electricity. Without being bound by theory, usually the screen is made of glass or another insulating material and is covered with a thin electrically conductive layer. When the operator touches the screen, some of the small electric charge is displaced. Sensitive detectors around the screen can detect which point on the screen has lost charge and is therefore able to identify the intended selection. Touchscreens also have a benefit of changing the appearance of various regions, but they tend to lack tactile feedback.

Accordingly, there remains the need for a new controller mechanism that includes benefits of both mechanical controller mechanisms and touchscreen mechanisms, yet minimizes disadvantages of each.

BRIEF SUMMARY OF THE INVENTION

The invention addresses deficiencies in controller design and provides related benefits through the development of a controller mechanism, which includes a selectable actuator with a touchscreen that displays a plurality of selectable positions and is configured to highlight a selection from the plurality of selectable positions by touch. Around the perimeter of the actuator extends a plurality of protrusions, which protrude outward. Also included is a frame with an aperture through which the selectable actuator extends, but through which none of the plurality of protrusions extend, thereby exposing the actuator for interactive use. A carriage having a spring biased upwards in an extended state, presses against the selectable actuator at a plurality of different locations to float the plurality of protrusions against the frame. Underneath the actuator is a shared selection button that is shared by all selectable positions along the touchscreen, and which is activated when the spring is sufficiently compressed. Entering the selection from the plurality of selectable positions includes highlighting the selection by touch and pressing the selection button using the actuator. During selection entry, the plurality of protrusions prevents substantial lateral movement of the actuator across different directions.

In some embodiments, the frame includes a plurality of notches configured to receive the plurality of protrusions so that each protrusion fits into its own corresponding notch. Preferably, the plurality of notches and plurality of protrusions are shaped complementary to minimize lateral sliding. Still more preferred, the plurality of notches and protrusions are rounded, which improves centering. Among the benefits of the plurality of notches and plurality of protrusions are that they can operate as fulcrums or pivot points in different directions when pressing the actuator while prevent slip or play in other directions.

In some embodiments, the spring includes a continuous member that is raised at four corners or regions. In other embodiments or further embodiments, the spring includes raised flanges, which can be positioned midway between neighboring corners and extending inwards. In some embodiments, the selection button is positioned in a middle region and underneath the actuator.

In a related aspect, the controller mechanism forms part of a universal remote control.

BRIEF DESCRIPTION OF DRAWINGS

Embodiments of the invention can be better understood with reference to the following drawings, which form part of the specification and represent preferred embodiments. The components in the drawings are not necessarily to scale, emphasis instead being placed upon illustrating the principles of the invention. And, in the drawings, like reference numerals designate corresponding parts throughout the several views.

DESCRIPTION OF PREFERRED EMBODIMENTS

The invention provides a controller mechanism, which can be used to control a variety of electronic devices and can be incorporated into a universal remote control. For clarity of disclosure, and not by way of limitation, the invention is discussed according to different detailed embodiments; however, the skilled artisan will recognize that features of one embodiment can be combined with other embodiments and is therefore within the intended scope of the invention.

Among the benefits of the invention include tight tolerances achieved with respect to reducing lateral movement of a movable actuator that extends outward from a frame. Side to side movement is not felt during ordinary operation at any position, which is especially challenging in instances where actuation requires combining a touchscreen feature with the manual pressing of a button. In addition, the controller mechanism is surprisingly compact, which allows its integration into a variety of electronic devices without sacrificing thickness.

One having ordinary skill in the art to which the invention belongs will appreciate that the controller mechanism as described herein can be integrated into a variety of electronic devices, where the selection of one feature from many others is desired. Examples include but are not limited to audio visual devices or audio visual components such as stereos, surround sound systems, equalizers, amplifiers, speakers, televisions, projectors, and the like, which tend to have various settings and menus from which a user can select various options (e.g. volume, channel/frequency). The controller mechanism can also be integrated into various electronic home appliances, such as refrigerators, coffee makers, washers, driers, HVAC systems, thermostats and the like where the user can be presented with selectable options for operating parameters (e.g. temperature, time, cycles, etc.). The controller mechanism can also be integrated into various electronic home security systems, such as those with cameras, microphones, speakers and the like to select from various options (e.g. video recording or quality, loudness or sensitivity, connectivity). In still another embodiment, the controller mechanism is integrated into a universal remote control that controls a plurality of different electronic devices, such as audio visual devices or audio visual components (e.g. stereos, surround sound systems, equalizers, amplifiers, speakers, televisions, projectors), electronic home appliances (e.g. refrigerators, coffee makers, washers, driers, HVAC systems, thermostats), home security systems, lighting, and others.

Figure 1:
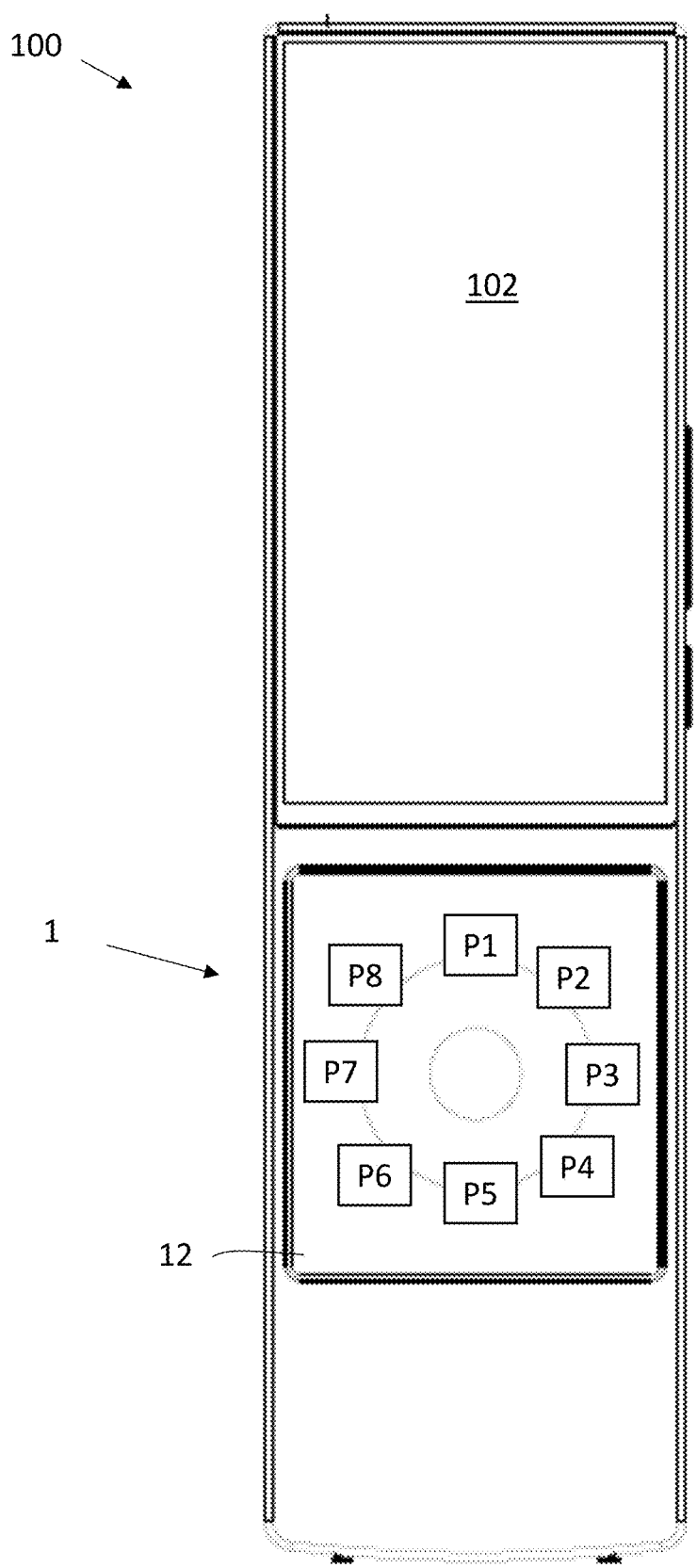
FIG. 1 is an exemplary remote control (100) having a controller mechanism (1) showing selectable positions (P1-P8).
Figure 2:
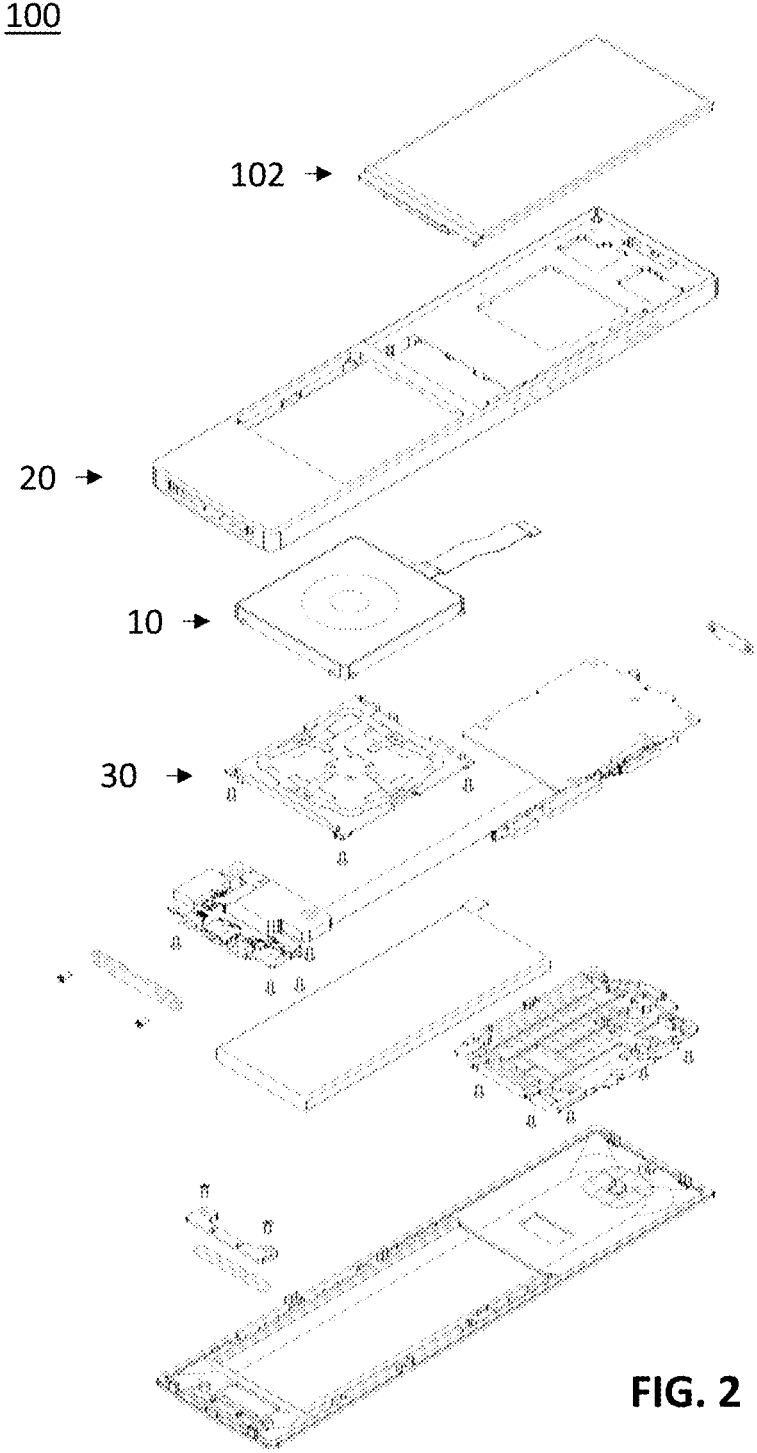
FIG. 2 is an exploded view of the remote control (100) of FIG. 1.

FIGS. 1 & 2 show the adoption of the controller mechanism (1) into a universal remote control (100) that itself is configured to control a plurality of different electronic devices wirelessly. The remote control (100) is shown with two screens. The first is a display screen (102). The display screen (102) can be used to display any desired information, such as information regarding the availability of electronic devices, information regarding a connected electronic device, device menus, programming available on a particular electronic device, and the like. Here the display screen (102) can also be a touchscreen, but in the embodiment shown it lacks the mechanical activation features as will be described in the paragraphs that follow. In particular, mechanical activation features are actuated using touchscreen (12), where the selection of one option over another is performed by a selectable position (e.g. P1-P8). Here, touchscreen (12) forms part of a selectable actuator (10) (shown better in FIG. 3 and FIG. 5). The touchscreen (12) is powered, displays a plurality of selectable options, and is configured to highlight a selection from a plurality of selectable options (shown as P1-P8 in FIG. 1) by touch. Activation by touchscreen is itself a technology well known to those having ordinary skill in the art, such as through the use of electrically conductive films and detectors that identify location(s) where loss of charge occurs. Here, the mechanism is programmed so that touching the touchscreen at an available option (e.g. P1-P8 in FIG. 1) will cause its highlighting. Highlighting can be by way of any approach known in the art, such as altering the shape, size, or coloring of a selection, flashing or other animation, or any combination thereof. As will be described in more detail in passages that follow, the selection of a displayed option includes highlighting the selection by touch and pressing actuator (10) to further select the highlighted selection. For completeness, the universal remote control (100) also includes transmitting/receiving structures and corresponding programming for communication with remote devices as well as power sources well known in the art to which the invention belongs.

Figure 3:
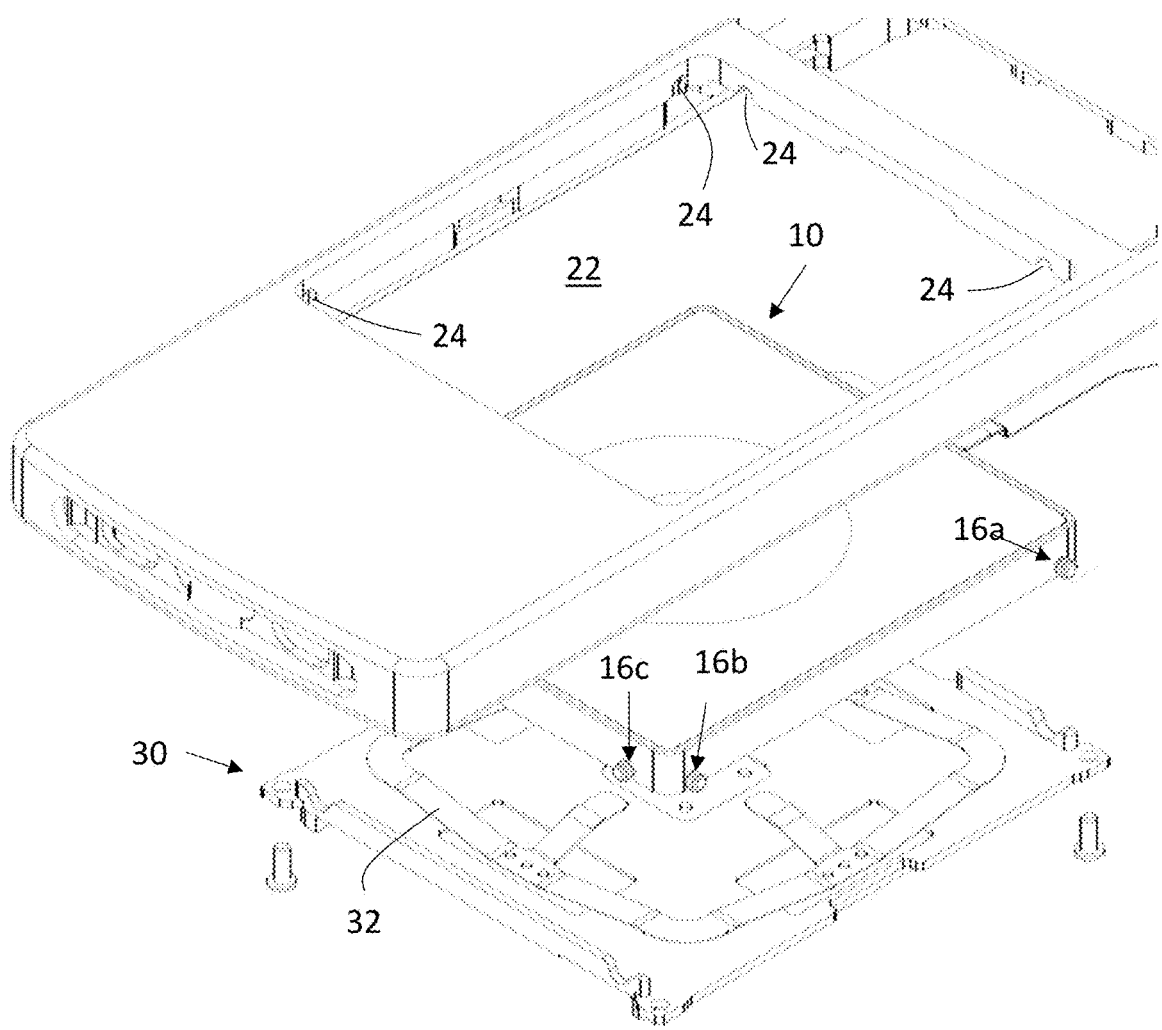
FIG. 3 is a partially exploded view depicting an exemplary positioning of the actuator (10) through an aperture (22) of the frame (20) by way of a spring (32) on a carriage (30).

FIG. 3 shows a partially exploded view depicting a relationship between the frame (20), selectable actuator (10), and carriage (30). In particular, the frame (20) includes an aperture (22) through which the selectable actuator (10) extends. However, shown around a perimeter (14) of the actuator (10) is a plurality of protrusions (16a-c) (protrusions (16a-h) shown better in FIG. 6), which increase the size of the actuator (10) and thus prevent its complete release from the frame (20). That is, while the selectable actuator (10) extends through the aperture (22), the protrusions (16a-h) do not extend through the aperture (22). Rather, passage of the plurality of protrusions (16a-h) is blocked by the frame (20) itself. Here, eight protrusions (16a-h) are provided and each is positioned at a corner region of the actuator (10). The actuator (10) is pressed upwards through the aperture (22) by way of the carriage (30) and in particular a spring mechanism (32) that presses against the bottom of the selectable actuator (10) at a plurality of different locations to float the plurality of protrusions (16a-h) against the frame (20).

Figure 4:
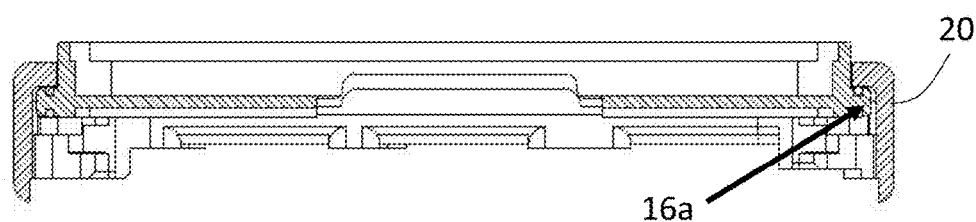
FIG. 4 is an exemplary cutaway view showing the tight tolerances achieved between exemplary protrusion (16a) and the frame (20) to reduce lateral sliding.

Preferably, the frame (20) also includes a plurality of notches (24) configured to receive and fitted against the plurality of protrusions (16a-h) while floating against the frame (20). Still more preferably, the plurality of notches (24) and plurality of protrusions (16a-h) are shaped complementary to one another, which tends to improve the fitting and decrease lateral movement of the actuator (10) within the aperture (22). Each protrusion (16a-h) is preferably assigned a corresponding notch (24). Still more preferably the plurality of notches (24) and plurality of protrusions (16a-h) are rounded or arced. Most preferably, the plurality of notches (24) and plurality of protrusions (16a-h) have the same arc for increasing contact surfaces. It was surprisingly found that by providing a rounded complementary shape and tight fitting, lateral movement or shifting of the actuator (10) within the aperture (22) could not be felt when pressing the actuator (10) in any of eight selectable directions (e.g. P1-P8 of FIG. 1), which substantially improved the tactile quality of the mechanism (1). This improved fitting can also be seen in FIG. 4, which shows tight tolerances obtained between exemplary protrusion (16a) and frame (20). In particular, the lateral movement of the actuator (10) of less than 1 mm, 0.5 mm, 0.1 mm, and 0.01 mm is achieved, even when pressed and during pressing itself.

Figure 5:
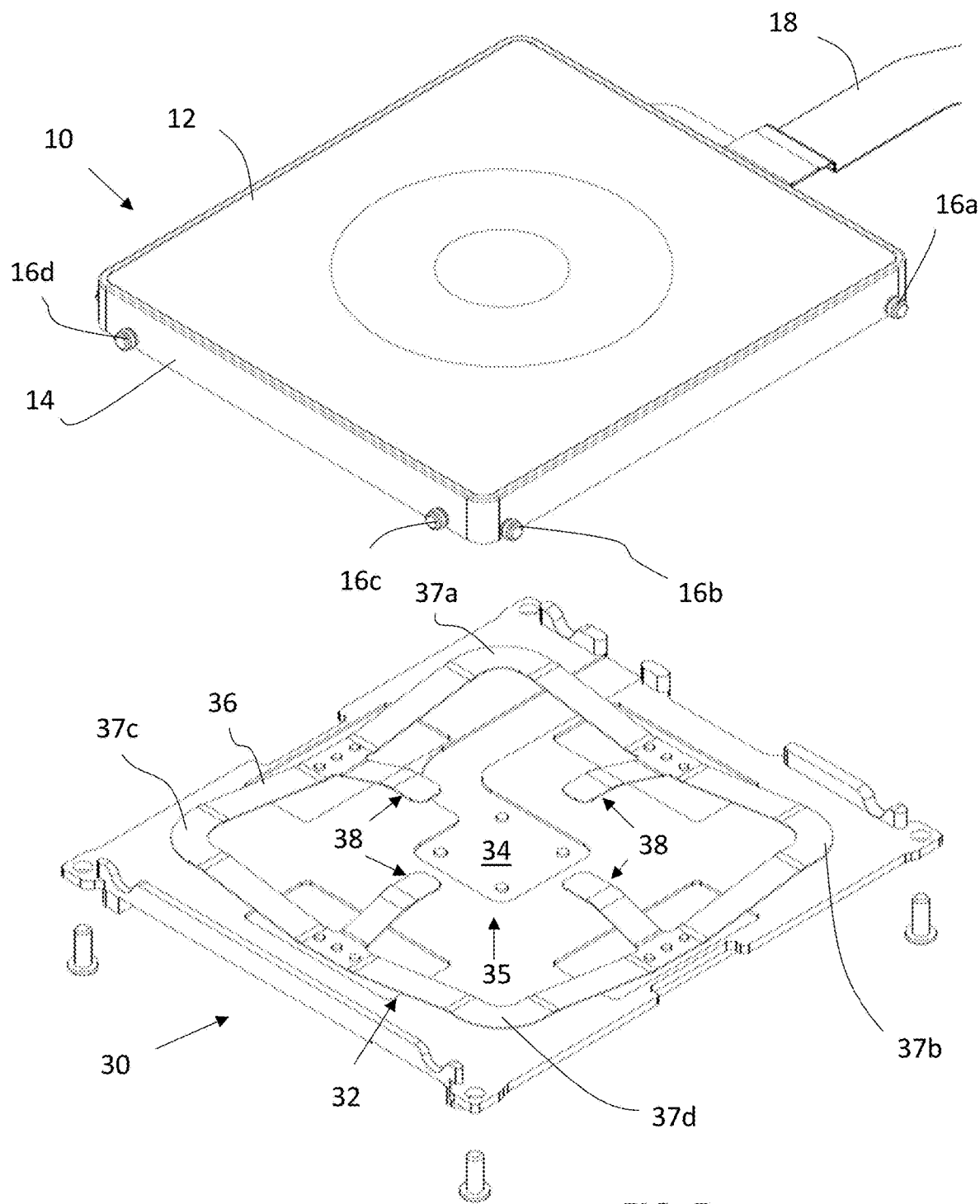
FIG. 5 is a partially exploded view depicting an exemplary positioning of the actuator (10) and various spring (32) configurations for floatingly positioning the actuator (10).

FIG. 5 shows a better view of the carriage and its relation to the actuator (10). In particular, the carriage (30) includes a spring (32), which presses upwards against the actuator (10) at a plurality of different locations. Here, the spring (32) is shown as a bendable continuous member (36) that has four corners (37a-d) biased upwards. Also shown are raised flanges (38) positioned about midway between each of the neighboring corners (37a-d), which are also biased upwards against the actuator (10). Here, the spring (32) is attached to the carriage (30) about midway between corners (37a-d). Pressing the actuator (10) downward compresses the spring (32) and when sufficiently compressed, a selection button (40) (shown in FIG. 5) is pushed, thereby signaling through a communication ribbon (18) that a selection has been made. Releasing the actuator (10) causes the spring (32) to return it to its original biased position.

Figure 6:
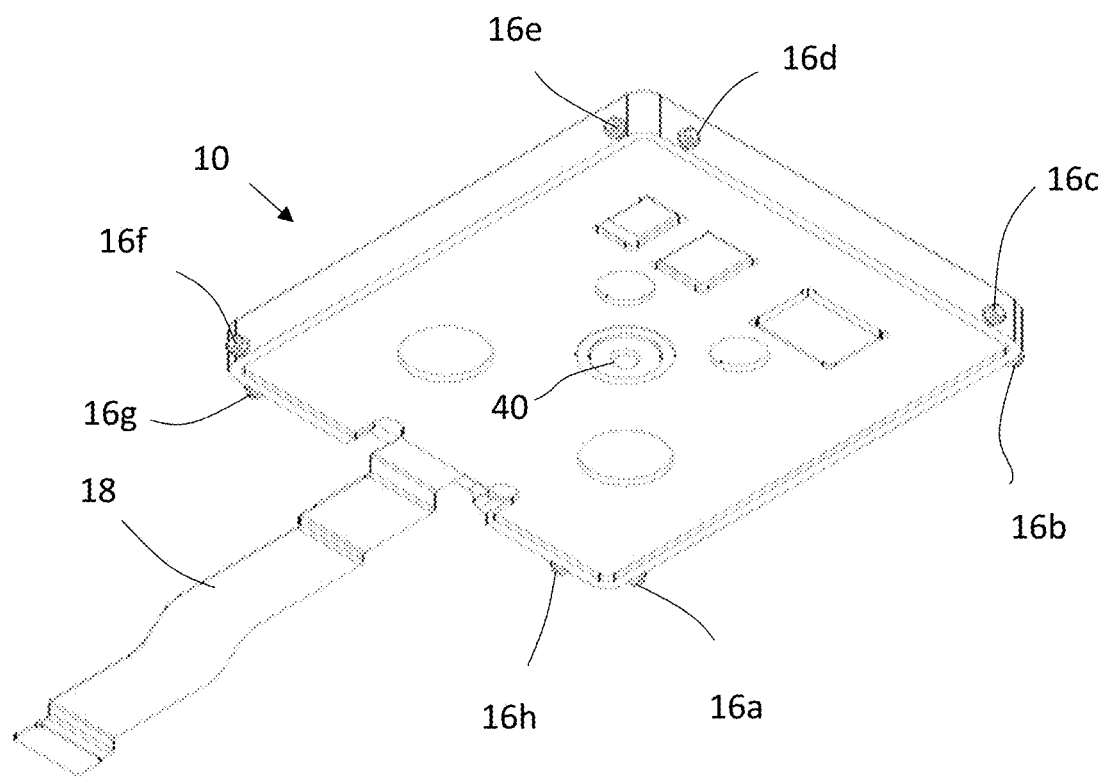
FIG. 6 is an exemplary bottom view of an actuator (10) showing a shared selection button (40).

With the above in mind, we now provide an overview of an exemplary operation of a remote control (100) with integrated controller mechanism (1). Beginning again at FIG. 1, with the remote control (100) in hand, the user is provided with eight selectable options (P1-P8), which for non-limiting exemplary purposes, will be programmed to operate a TV (P1), a DVD Player (P2), a stereo (P3), a speaker (P4), a household thermostat (P5), a coffee maker (P6), a refrigerator (P7), and a light bulb (P8). The user touches the area indicated as P1 to select "TV" and area P1 flashes. The user presses down against P1. Jumping to FIGS. 5-6, the spring (32) at corners (37a, 37b) and the flange (38) between them are compressed, which causes protrusions (16c, 16d) to operate as a fulcrum and simultaneously prevent lateral sliding by way maintaining their position in the notches (not shown). As the spring (32) compresses, the selection button (40) shown in FIG. 6 is eventually pressed against carriage (30) at midplate (34) of FIG. 5. The selection of highlighted position P1 is then communicated through communication ribbon (18), the instruction executed using transmission technologies and frequencies well known in the art to which the invention belongs, and optionally new menu or submenu options are presented at any one or more of positions P1-P8 in FIG. 1 for further menu and/or submenu selections.

For exemplary purposes, selecting position P2 would then cause the spring (32) at corner (37b) to compress while opposing protrusions (16d, 16e) operate as the fulcrum; selecting position P3 would then cause the spring (32) at corners (37b, 37d) to compress while opposing protrusions (16e, 16f) operate as the fulcrum; selecting position P4 would then cause the spring (32) at corner (37d) to compress while opposing protrusions (16f, 16g) operate as the fulcrum; selecting position P5 would then cause the spring (32) at corners (37c, 37d) to compress while opposing protrusions (16g, 16h) operate as the fulcrum; selecting position P6 would then cause the spring (32) at corner (37c) to compress while opposing protrusions (16a, 16h) operate as the fulcrum; selecting position P7 would then cause the spring (32) at corners (37a, 37c) to compress while opposing protrusions (16a, 16b) operate as the fulcrum; and selecting position P8 would then cause the spring (32) at corner (37A) to compress while opposing protrusions (16b, 16c) operate as the fulcrum.

The invention described in the above exemplary embodiments may be embodied in other specific forms without departing from the spirit or essential characteristics thereof. The specific embodiments previously described are therefore to be considered as illustrative of, and not limiting, the scope of the invention.

What is claimed is:

1. A controller mechanism, comprising:
   a selectable actuator comprising a touchscreen that displays a plurality of selectable positions and is configured to highlight a selection from the plurality of selectable options by touch, the actuator further comprising a perimeter and a plurality of protrusions that protrude outward from the perimeter;
   a frame comprising an aperture through which the selectable actuator extends and the plurality of protrusions do not extend;
   a carriage comprising a spring that presses against the selectable actuator at a plurality of different locations to float the plurality of protrusions against the frame and a shared selection button that is shared across each of the plurality of selectable positions that can be pressed by the actuator when the spring is compressed;
   wherein entering the selection from the plurality of selectable options includes highlighting the selection by touch and continuing to press the selection until pressing the shared selection button; and
   wherein the plurality of protrusions prevent lateral movement of the actuator.

2. The controller mechanism of claim 1, wherein frame comprises a plurality of notches configured to receive the plurality of protrusions.

3. The controller mechanism of claim 2, wherein the plurality of notches and plurality of protrusions are shaped complementary.

4. The controller mechanism of claim 3, wherein the plurality of notches and plurality of protrusions are rounded.

5. The controller mechanism of claim 2, wherein the plurality of notches and plurality of protrusions operate as fulcrums in different directions.

6. The controller mechanism of claim 1, wherein the plurality of protrusions comprises eight protrusions, each protrusion being positioned at a corner region of the actuator.

7. The controller mechanism of claim 1, wherein the spring comprises a continuous member that is biased upwards at four corners.

8. The controller mechanism of claim 1, wherein the spring comprises raised flanges.

9. The controller mechanism of claim 1, wherein the spring comprises a continuous member that is biased upwards at four corners and a flange positioned midway between each corner that extends inward and is biased upward.

10. The controller mechanism of claim 1, wherein the shared selection button extends underneath the actuator and is positioned at a middle region of the actuator.

11. A universal remote control for controlling a plurality of different electronic devices, the remote control comprising the controller mechanism of claim 1.

* * * * *